Feb. 19, 1952 — C. B. ESCH — 2,586,631
AUTOMOBILE WINDOW ARMREST
Filed Nov. 21, 1947
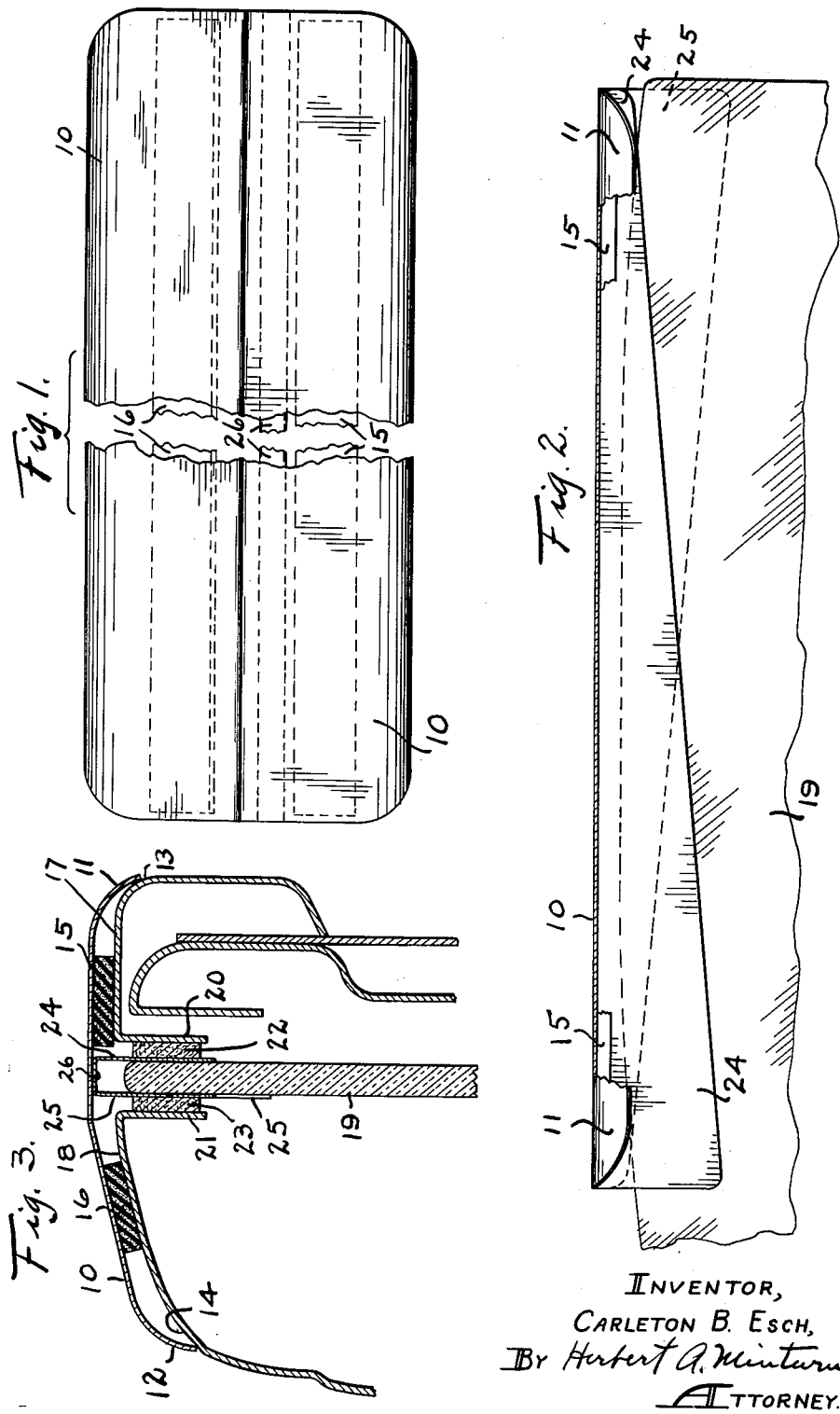
INVENTOR,
CARLETON B. ESCH,
By Herbert A. Minturn,
ATTORNEY.

Patented Feb. 19, 1952

2,586,631

UNITED STATES PATENT OFFICE 2,586,631

AUTOMOBILE WINDOW ARMREST

Carleton B. Esch, Indianapolis, Ind.

Application November 21, 1947, Serial No. 787,429

1 Claim. (Cl. 296—49.2)

This invention relates to an arm rest attachment for automobile doors and is incorporated in a structure which frictionally engages with the vertically shiftable glass of the door and is intended to completely cover the slot through which that glass travels and extend over on each side of the door thereof. While the structure is frictionally attached to the glass, it may remain attached to the glass throughout any elevated or lowered positions, and in fact may provide a sun shield to a limited extent to protect the driver or even the rider against rays of light coming from the side within quite a few degrees from the vertical when the glass is in a raised position.

The invention will be better understood in the following description which is made in reference to the accompanying drawing, in which Fig. 1 is a view in top plan;

Fig. 2, a view in side elevation and partial section; and

Fig. 3, a transverse vertical section through the arm rest as applied to a typical door construction.

Like characters of reference indicate like parts in the several views in the drawing.

A shield member 10 is made out of any suitable material, such as metal or even plastic, to have a width sufficient to bridge the distance from inside to outside of the opening through the door. The member 10 is provided with a downturned lip 11 and another downturned lip 12 on the outer side, to have these two lips fit against the downwardly curving portions of the respective door surfaces 13 and 14, Fig. 3. Under the member 11 are positioned spaced apart resilient material strips 15 and 16, preferably sponge rubber, to bear against the upper portions of the door surfaces 17 and 18.

The shiftable glass 19 is mounted in the usual manner to travel vertically between the downturned lips 20 and 21 between intervening felt strips 22 and 23.

The member 10 is provided with downturned elastic legs 24 and 25 secured to the underside of the member in any suitable manner, herein shown as constituting spaced apart legs forming a U channel, the web 26 of which is secured to the member 10. These legs 24 and 25 have their under edges sloped from one end to the other in opposite directions, as indicated in Fig. 2. That is, the left hand end of the leg 24 represents the maximum depth from which the leg slopes upwardly and to the right toward the end of the member 10. The leg 25 on the other side has its maximum depth on the right hand end and slopes upwardly to the left. Normally, the lower edges of these two legs 24 and 25 slope inwardly, laterally, one toward the other and have to be spread apart to receive the upper end of the glass 19 therebetween, as indicated in Fig. 3. These legs 24 and 25 are inserted over the top edge portion of the glass 19 by being forced apart one from the other. This is facilitated by applying, for example, the left hand end portion of the leg 24 down on the side of the glass 19 with the member 10 in an upwardly rocked position. Then this left hand end may be held down toward the glass 19 while the right hand end is rocked down to bring the other leg 25 down along the opposite side of the glass. In so doing, these legs frictionally grip the glass 19 therebetween, and they are sufficiently thin in cross section to permit them to enter between the felts 22 and 23 when the glass 19 is in its lowermost position, as indicated in Fig. 3, so that the member 10 is then firmly seated against the door members 17 and 18 with the cushion strips 15 and 16 bearing thereagainst so as to prevent any marring of the finish on those members. The glass 19 may be raised and lowered without having to shift the member 10 in any respect. When the glass 19 is in the lowered position, the upper surface of the member 10 forms a smooth and comfortable rest for the arm. The spacing of the member 10 from the door surfaces aids in setting up a cooling action of the member 10 to permit air to travel therebetween. The overall length of the member 10 is made to be such that it may be inserted within the opening provided in the door so that the member 10 may be lifted with the glass 19.

While I have herein shown and described my invention in the one particular form, it is obvious that structural changes may be made without departing from the spirit of the invention, and I therefore do not desire to be limited to that precise form beyond the limitations as may be imposed by the following claim.

I claim:

In an automobile window wherein a vertically shiftable glass is slidably retained laterally by felt compressed respectively against the inner and outer faces of the glass adjacent the top edge portion of the glass when in lowered position, the combination of a transverse shield member for bridging across the glass to serve as an arm rest; a depending, planar tongue of thin, spring-like metal, fixed by its upper portion to said member, and having an under edge inclined from the under part of one end to slope upwardly to the opposite end to merge approximately into said member; a second depending, planar tongue of thin, spring-like metal fixed by its upper portion to said member, and having an under edge inclined from the under part of one end opposite to said one end of the first tongue, to slope upwardly to the opposite end to merge approximately into said member; said two tongues extending entirely across said member to present opposing metallic faces spaced to grip entirely thereacross yieldingly against said glass faces to have the crossing of said lower edges located substantially centrally of said member; and said member having a length equal to the normal length of area of contact of one's forearm resting thereon.

CARLETON B. ESCH.

REFERENCES CITED

The following references are of record in the file of this patent:

UNITED STATES PATENTS

| Number | Name | Date |
| --- | --- | --- |
| 1,070,683 | Hale | Aug. 19, 1913 |
| 1,625,791 | Campbell | Apr. 26, 1927 |
| 1,756,694 | Loehr | Apr. 29, 1930 |
| 1,873,190 | Doller | Aug. 23, 1932 |
| 1,902,730 | Shaw | Mar. 21, 1933 |
| 1,962,508 | Josselyn | June 12, 1934 |
| 2,344,339 | Zwald | Mar. 14, 1944 |